July 21, 1959     R. W. COOK     2,896,155

PIPE JOINT-LOCATING DEVICE

Filed Nov. 24, 1953

*INVENTOR.*
ROBERT W. COOK

BY
Lockwood, Galt, Woodard, & Smith
ATTORNEYS

United States Patent Office 2,896,155
Patented July 21, 1959

2,896,155

PIPE JOINT-LOCATING DEVICE

Robert W. Cook, Fort Wayne, Ind., assignor, by mesne assignments, to Charles W. Fuelling, Fort Wayne, Ind.

Application November 24, 1953, Serial No. 394,003

4 Claims. (Cl. 324—34)

The present invention relates to a pipe joint-locating device and method and more particularly to a device and method for locating joints between sections of a pipe line composed of ferrous material.

In certain industries, such as gas-distributing industries, it is often necessary to repair or reseal existing underground pipe lines against leakage. While a problem of gas leakage from gas mains has at all times been serious, the recent heavy increases in demand for gas service has required the use of substantially higher gas pressures in the mains, whereupon points of weakness in the main have broken through as a result of existing leaks, regarded as minor heretofore, have been seriously aggravated.

In the repair of a gas main buried beneath the surface of the ground a distance, for example, of six feet, it is first necessary to establish the location of the line and then to determine the point of gas leakage. Having determined the latter, it is necessary to dig down to the pipe, find the exact location of the leak, and then effect the necessary repair. By reason of the aforementioned increased pressures, among other reasons, the joints between individual sections of the main may not be adequately sealed to prevent leakage, whereupon it is necessary to drive the aforesaid holes at every joint location, and then to repack the joint. Since the individual sections of the pipe line vary appreciably in length, for example, three feet to twelve feet, a number of holes are uselessly dug in order to find every single joint location. Whenever a hole is dug without locating a joint, this represents wasted effort and expense, as well as creating undue damage to the ground surface through which the hole is dug. This latter problem becomes especially serious where it is necessary to break through a pavement of existing streets, since a roughness on the surface of the street usually results which is difficult to maintain.

In view of the foregoing problem presented in locating pipe joints for the purpose of effecting the repair thereof, it is an object of this invention to provide both a device and method for accurately locating each pipe joint in a ferrous metallic line.

It is another object of this invention to provide a joint-locating device which is operative to produce a positive indication of the location of a joint.

It is another object of this invention to provide a joint-locating device which is relatively small in size such that it may be introduced into a small opening in an existing main and projected into the main for a predetermined, relatively long distance for locating serially, the pipe joints. This feature is important, since it is desirable that only a small opening be made in the pipe for introducing the joint-locating device such that normal functioning of the line will not be disturbed.

It is yet another object of this invention to provide an electro-magnetic locating device which will positively indicate the location of a pipe joint as a result of a difference in reluctance at the pipe joint from that of the pipe sections between joints.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
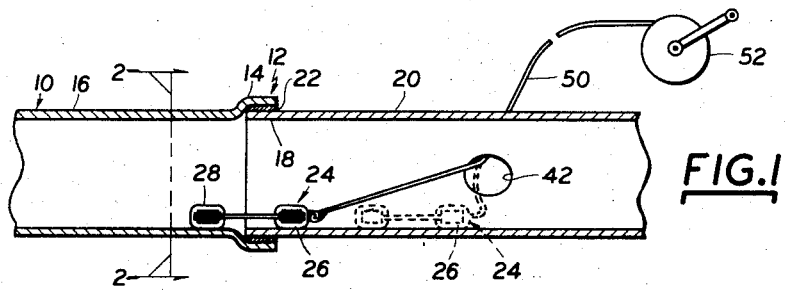
Fig. 1 is a partial axial section of a typical ferrous gas main in which an embodiment of the present invention is positioned.

Referring to the drawings, and more particularly to Fig. 1, a typical conventional cast iron gas main, indicated generally by the reference numeral 10, is shown as being provided with the usual bell-spigot joint 12 which is comprised of the enlarged diameter bell-mouthed end 14 on one pipe section 16 and a smaller diameter end portion 18 on the other pipe section 20. The usual jute, lead or other sealing compositions 22 is driven into the space between the pipe ends 14 and 18 to provide a fluid seal. Occasionally, and in recent years by reason of increased gas pressures or deterioration of the composition, these seals 22 have become loosened or weakened to such an extent that a general leakage occurs through the joint, whereupon it is necessary to reseal the joint.

With the pipe line located beneath the surface of the ground, it obviously presents a serious and difficult problem in locating the joint accurately so that the hole dug from above will coincide with the joint.

Figure 4:
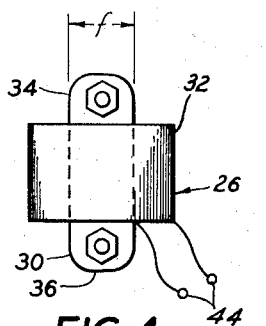
Fig. 4 is an end view of the same embodiment.
Figure 5:
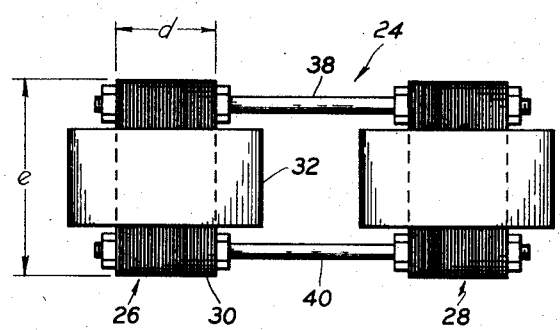
Fig. 5 is a top view.

A device, indicated generally by the reference numeral 24, serves the purpose of accurately locating the joint and will now be described in detail. The device is composed of primary and secondary electromagnetic assemblies or inductors 26 and 28, each inductor consisting of a laminated iron core 30 and a suitable coil 32. As seen more clearly in Figs. 4 and 5, the opposite ends 34 and 36 of the core 30 project respectively beyond the ends of the coil 32. The significance of this structural feature will be explained more fully hereinafter. In Fig. 4 it will be seen that the core ends 34 and 36 are rounded. The reason for this will also be explained hereinafter.

A rigid frame composed of some non-ferrous material, such as bronze, includes two bar members 38 and 40 which are suitably threaded at the opposite ends for fastening to the opposite core ends 34 and 36, respectively. These bars 38 and 40 pass through transverse openings in the core ends 34 and 36 in such a manner as to secure the core laminations together into a rigid assembly as well as to support the two inductors 26 and 28 in rigid, mutually inductive relationship. Also, it will be noted that the frame 38 and 40 is disposed inside the outermost dimensions of the cores 30 to keep the size of the overall device as small as possible and to achieve proper positioning of the device in the pipe as will be explained later.

The coils 32 are rectangular in cross section as are the cores 30 to provide sufficient mass for producing a sufficiently powerful magnetic field in as small an assembly as possible in order to enable insertion of the device 24 through a relatively small size opening 42 (Fig. 1) cut into the side wall of the gas main.

One reason for the success of the present invention is the fact that it is satisfactorily small but yet absolutely reliable and sensitive in the location of pipe joints. While it is possible to use a much larger assembly, such a large size is not satisfactory since a large opening would be required in the side of a gas main. Such a large opening would dangerously weaken and interfere with the normal functioning of the gas main and thereby render the device unsuitable for the purpose for which it is intended.

Suitable leads 44 are connected to the primary inductor 26 for applying alternating current power thereto, and other leads 46 are connected to the secondary inductor 28 for detecting a voltage induced therein.

Figure 6:
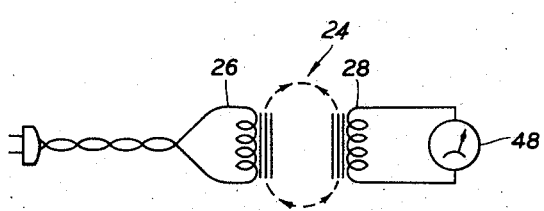
Fig. 6 is an equivalent electrical circuit diagram.

As illustrated diagrammatically in Fig. 6, the inductors 26 and 28 are positioned such that magnetic lines of force produced by the primary inductor 26 may be caused to pass through or link inductor 28 for inducing a voltage in the latter. An ordinary voltage-indicating meter 48 may be used to measure the voltage induced in the secondary inductor 28.

In operation, the device 24 is first connected to a suitable propelling cable or cord 50 which may be of the flexible, non-compressible type for pushing the device 24 through the main, or in the alternative may consist of a flexible cord which may be used to pull the device through the main upon operation of the reel 52.

Figure 2:
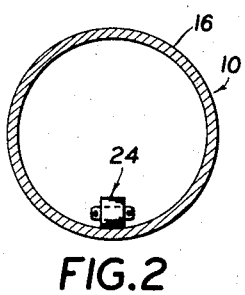
Fig. 2 is a cross-section taken substantially on section line 2—2 of Fig. 1.

Assuming that a pushing-type cable 50 is used for forcing the device 24 through the main, the device 24 is first passed through an opening 42 cut in the side of the gas main for positioning the device 24 on the bottom surface of the main. It is desirable that the device 24 be positioned as shown in Fig. 2 such that the core tips 34 and 36 will not contact the sides of the main 10. Should the initial installation position the device 24 on the core tips 34 or 36, the device will fall over onto its side by reason of the curvature provided on the tips as illustrated in Fig. 4. Thus, proper operative position of the device is at all times assured.

Suitable power, such as 110 volts A.C., is now fed to the primary inductor 26 which serves to produce magnetic flux which passes from the primary core tips into the iron pipe. Some of this magnetism passes axially through the pipe and enters the inductor 28 thereby inducing a voltage which may be measured by the meter 48. Still another path is provided circumferentially of the pipe so as to be confined essentially to only the primary core 26. With the device 24 positioned as shown in the dashed lines in Fig. 1, immediately after introduction into the main opening 42, the voltage induced in the secondary inductor 28 is observed and recorded. The device 24 is next slowly urged forwardly through the main 10 until such time as a drop in the indicated voltage on the meter 48 is observed. This drop in voltage indicates the location of a joint and will occur when the device 24 is situated as illustrated by the full line drawing of Fig. 1.

The reason for this sudden drop in voltage is attributed to the increased value of reluctance to the passage of magnetism axially of the pipe which occurs at the joint 12. By reason of this increased reluctance, less magnetism is available for inducing a voltage in the secondary inductor 28, and no force or energy will be present to cause the same degree of axial flow as obtained during the time the device 24 is not straddling a joint. Instead, the circumferential path through the pipe 16, offering a lower relucance path, will serve to shunt the magnetism away from the axial path through the joint 12 thereby insuring reduced axial flow and positive indication of the joint location.

Figure 3:
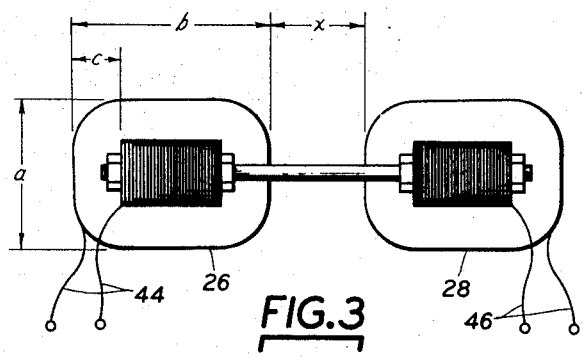
Fig. 3 is a side elevation of the embodiment of Fig. 1.

The two inductors 26 and 28 have a spacing therebetween which is critical to the proper operation of the device. It will be noted in Figs. 1 and 2 that with the device 24 positioned as shown, air gaps will prevail between the core tips 34 and 36 and the adjacent surfaces of the pipe walls. By maintaining the spacing "x" (Fig. 3) between the two inductors 26 and 28 such that the air path between the two inductors is normally greater in value than the reluctance air path between the core tip ends 34 and 36 and the pipe line 10, the magnetic flux from the primary inductor 26 will thereby normally enter the pipe then flow directly between the inductors. Thus, by utilizing the pipe as a functional part of the system for locating the joints, a sudden increase in the reluctance of the path through the pipe will serve to reduce the magnetic coupling between the primary and secondary inductors 26 and 28. This sudden increase in reluctance appears at every pipe joint 12 by reason of the spacing between the pipe section ends 14 and 18.

Without the presence of the circumferential reluctance path through the pipe tending to restrict the lines of force produced by the inductor 26 to the latter only, a shunt path for diverting flux from the secondary inductor 28 when a joint 12 is straddled prevents the possibility of a pipe-joint from being forcefully traversed by the same number of flux lines as will pass through the pipe line when the device is located as illustrated in dashed lines in Fig. 1. Such forceful traversing would obviously conduce to insensitiveness in the device 24 such that the meter 48 would give no differential indication between a joint and solid pipe.

As explained previously, the spacing between the inductors 26 and 28 is critical. If the spacing is too close, the device becomes insensitive to the location of a pipe joint. If the spacing is too great, the device also becomes in sensitive by reason of the high reluctance path. Furthermore, improved sensitivity is achieved by the device 24 lying on its side as illustrated in Figs. 1 and 2, this feature being especially significant in the fact that this invention may be used to detect joints in almost any size of pipe.

Actual experimentation has also proven that the invention is substantially more sensitive when the core tips 34 and 36 project beyond the adjacent respective ends of the coil 32. While this condition exists and serves to improve operating efficiency, the theory behind the reason is not understood.

While certain specifications for a satisfactorily operating embodiment of this invention are given in the following, it will be understood that such specifications are given by way of example only and that the scope of the invention is to be determined by the appended claims.

Coils 32, 7,000 turns, No. 40 enamel covered wire layer wound:

| | Inches |
|---|---|
| Dimension "a" | 7/8 |
| Dimension "b" | 1½ |
| Dimension "c" | ¼ |
| Dimension "d" | 7/8 |
| Dimension "e" | 7/8 |
| Dimension "f" | ½ |

What is claimed is:

1. A pipe line joint-locating device comprising primary and secondary inductors supported in mutually inductive relation, each inductor comprising a core of ferrous material and a coil mounted thereon, the opposite ends of the core projecting beyond the respective ends of the coil and rigid non-ferrous frame members secured between the core ends of the two inductors for securing the latter together, each frame member passing through one end of each core to be secured to the latter and to secure both cores in substantially parallel relation, both inductors being separated a predetermined distance to provide a high reluctance path therebetween.

2. A pipe line joint-locating device comprising primary and secondary inductors supported in mutually inductive relation, each inductor comprising a core of ferrous material and a coil mounted thereon, the opposite ends of the core projecting beyond the respective ends of the coil and rigid non-ferrous frame members secured between the core ends of the two inductors for securing the latter together, each frame member passing through one end of each core to be secured to the latter and to secure both cores in substantially parallel relation, said members being positioned inside the outermost dimensions defined by the core ends, said core ends being rounded so as to cause the device to rock to one side or the other when the device is positioned on a supporting surface.

3. A pipe line joint-locating device comprising primary and secondary inductors supported in mutually inductive relation, each inductor comprising a core of ferrous material and a coil mounted thereon, non-magnetic frame means spacing said inductors apart and securing said cores in substantially parallel relation, and means cooperatively associated with said inductors to cause the device to rock to a predetermined position when the device is positioned on a curved supporting surface.

4. A device adapted to be inserted into a run of ferrous pipe for locating the joints therein comprising primary and secondary inductors supported in mutually inductive relation, each inductor comprising a core of ferrous material and a coil mounted thereon, rigid non-ferrous frame members extending between the inductors for positioning the core members transversely to the longitudinal axis of the pipe into which the device is inserted, said frame members spacing said inductors apart sufficiently to provide a reluctance path of a value either substantially equal to or greater than the reluctance between said cores and the adjacent inner face of said pipe.

References Cited in the file of this patent

UNITED STATES PATENTS

| | | |
|---|---|---|
| 1,096,229 | Dodds | May 12, 1914 |
| 2,124,579 | Knerr | July 26, 1938 |
| 2,220,070 | Aiken | Nov. 5, 1940 |
| 2,267,884 | Zuschlag | Dec. 30, 1941 |
| 2,311,715 | Thorne | Feb. 23, 1943 |
| 2,558,427 | Fagan | June 26, 1951 |
| 2,790,140 | Bender | Apr. 23, 1957 |